US008195235B2

(12) United States Patent  
Montes

(10) Patent No.: US 8,195,235 B2
(45) Date of Patent: Jun. 5, 2012

(54) METHOD AND DEVICE FOR CUSTOMISING A RADIO COMMUNICATION TERMINAL, CORRESPONDING RADIO COMMUNICATION TERMINAL, SIM CARD, SERVER, COMPUTER PROGRAM PRODUCT AND STORAGE MEANS

(75) Inventor: Jacques Montes, Paris (FR)

(73) Assignee: Wavecom, Issy-les-Moulineaux (FR)

( * ) Notice: Subject to any disclaimer, the term of this patent is extended or adjusted under 35 U.S.C. 154(b) by 518 days.

(21) Appl. No.: 12/376,041

(22) PCT Filed: Jul. 31, 2007

(86) PCT No.: PCT/EP2007/057868
§ 371 (c)(1),
(2), (4) Date: Apr. 22, 2009

(87) PCT Pub. No.: WO2008/015206
PCT Pub. Date: Feb. 7, 2008

(65) Prior Publication Data
US 2009/0318191 A1    Dec. 24, 2009

(30) Foreign Application Priority Data
Aug. 1, 2006    (FR) ...................................... 06 07042

(51) Int. Cl.
*H04M 1/00* (2006.01)
(52) U.S. Cl. ........................................ 455/558; 455/90.1
(58) Field of Classification Search .................. 455/90.1, 455/90.2, 411, 558; 713/168, 176, 193
See application file for complete search history.

(56) References Cited

U.S. PATENT DOCUMENTS

| 5,875,404 | A |  | 2/1999 | Messiet |
|---|---|---|---|---|
| 6,487,425 | B1 | * | 11/2002 | Thakker et al. ............... 455/574 |
| 2003/0120920 | A1 |  | 6/2003 | Svensson |
| 2005/0208933 | A1 | * | 9/2005 | Hospes ......................... 455/419 |
| 2006/0183500 | A1 | * | 8/2006 | Choi ............................. 455/558 |
| 2006/0236111 | A1 | * | 10/2006 | Bodensjo et al. ............. 713/176 |

FOREIGN PATENT DOCUMENTS

| WO | 01/76309 | 10/2001 |
|---|---|---|
| WO | 03/039176 | 5/2003 |
| WO | 03/077585 | 9/2003 |

OTHER PUBLICATIONS

French Search Report of counterpart foreign Application No. 06/07042 filed Aug. 1, 2006.
International Search Report of counterpart foreign Application No. PCT/EP2007/057868 filed Jul. 31, 2007.
International Preliminary Report on Patentability and Written Opinion of counterpart foreign Application No. PCT/EP2007/057868 filed Jul. 31, 2007.

\* cited by examiner

*Primary Examiner* — Dwayne Bost
*Assistant Examiner* — Myron Wyche
(74) *Attorney, Agent, or Firm* — David D. Brush; Westman Champlin & Kelly, P.A.

(57) ABSTRACT

A method is provided for customizing a radio communication terminal possessing an operating mode requiring first customization data so as to allow a first radio communication link with a radio communication network. The method includes the following steps: placing the terminal in an actual usage condition, not including the first customization data; transmitting the first customization data from a customization device to the radio communication terminal, via a second link distinct from the first link.

18 Claims, 2 Drawing Sheets

METHOD AND DEVICE FOR CUSTOMISING A RADIO COMMUNICATION TERMINAL, CORRESPONDING RADIO COMMUNICATION TERMINAL, SIM CARD, SERVER, COMPUTER PROGRAM PRODUCT AND STORAGE MEANS

CROSS-REFERENCE TO RELATED APPLICATIONS

This Application is a Section 371 National Stage Application of International Application No. PCT/EP2007/057868, filed Jul. 31, 2007 and published as WO 2008/015206 on Feb. 7, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radio communications and more especially radio communication devices, such as radio telephones, Personal Digital Assistants (PDAs), radio communication terminals, designed to be fitted on-board machines or vehicles for example.

More precisely, the disclosure relates to an identity management technique, which allows radio communication devices to be customised.

The disclosure especially applies, but not exclusively, to radio communication devices comprising a SIM (Subscriber identity Module) card.

The disclosure especially has applications in the M2M (Machine to Machine) field, wherein machines have radio communication terminals so that they may communicate with one another and/or with several items of equipment (typically a server).

BACKGROUND OF THE DISCLOSURE

In order to simplify the description, the rest of the document will simply describe the specific case where the radio communication device is a GSM radio communication terminal with a SIM card. A person skilled in the art may extend this technique quite simply to any other type of radio communication terminal.

Usually, a GSM radio communication terminal cannot access the services of the GSM network without a customised SIM card (which is to say a SIM card with activated customisation data). Indeed, a SIM card is a module comprising all of the data concerning the subscriber, which is to say an IMSI (International Mobile Subscriber Identity) identity number, a Ki authentication key, as well as associated authentication algorithms of the subscriber to the GSM network.

When customising radio communication terminals, certain of the following objectives are reconciled if possible:
  the simplicity of the operations to activate the customisation, wherein the user must be able to carry out these operations with a limited number of operations, and each of these operations must be as easy as possible;
  security of the customisation data;
  simple and cheap to implement.

1. Customisation in a M2M Application

The disadvantages of the prior art will be discussed below via the specific case wherein a GSM radio communication terminal is to be customised that is on-board a remote data-measuring appliance, for example a water meter.

The current customisation technique consists, for a user, in choosing a PLMN (Public Land Mobile Network), buying a customised SIM card from one of the outlets of the selected operator, then inserting the customised SIM card into a radio communication terminal. In this way, the radio communication terminal is customised and can access the PLMN services of the selected operator.

The inventors have observed that the above-mentioned current technique has a certain number of disadvantages in certain situations, especially in the context of a M2M type point to point mode application.

The efficiency of this known technique is limited by the fact that the radio communication terminal, once customised, does not always use the best radio resources (also called hereunder carriers or beacon signals) that are available where it is located.

Indeed, the user chooses an operator without precisely knowing the quality of the network (PLMN) of this operator at the location where the terminal will subsequently be used.

In the worst case, the radio communication terminal, which has already customised by a user to work with a given operator, may even be placed in a geographical cell that is not covered by this selected operator.

Another disadvantage of this known technique lies in the fact that it does not permit a company that wishes to install millions of terminals (for example embedded in water meters) to optimise the choice of the operator (i.e. the network) for each terminal.

2. Customisation as Part of Twin SIM Card Management

The disadvantages of the prior art will now be discussed using the specific case of dual SIM cards.

By dual SIM cards, it is meant in this description SIM cards that each have distinct customisation data (IMSI number, Ki key) but which are jointly managed by the radio communication network operator. For example, dual SIM cards operate with the same MSISDN (Mobile Station ISD Number) and the same subscription.

Currently, an increasing number of users have several radio communication terminals.

To ensure optimal accessibility, mobile telephone operators offer users a set of two SIM cards, called dual SIM cards.

Each of the dual SIM cards is designed to be inserted into a separate terminal.

Consequently, the user may have a single call number, a single voice mail and a single subscription for both terminals. Usually, calls arrive first to one of the two terminals and are transferred to the other terminal if there is no answer. The correspondence between the number called and one or the other of the SIM cards (which is to say between one or the other of the ISMI associated to these SIM cards) is made at network level, in particular by the HLR (Home Location register) server.

By way of example, it is supposed that the user inserts a first dual SIM card into its own radio communication terminal and wishes to use a radio communication terminal on-board a rental car. With the current technique mentioned above, the user must insert a second dual SIM card in the terminal of the rental car.

The inventors have observed that the current technique has a certain number of disadvantages in certain situations, especially in the above context (dual SIM cards).

Indeed, the ergonomics of this known technique are limited by the fact that user, who wishes to activate and use the terminal of the rental car quickly, must first of all find the second dual SIM card (in the user's pocket, wallet, briefcase, etc.), access the terminal of the car (for example in the boot or trunk), remove the protective cover of this terminal to access the SIM card holder, insert the second dual SIM card in this holder and the fit the cover again.

In certain cases, some users return their rental car and forget or do not have time to take out their second dual SIM card.

Sometimes, users who are not familiar with mobile telephones do not know where or in which direction the second dual SIM card is to be inserted, and they may damage the terminal of the rental car.

Furthermore, most car manufacturers henceforth prefer radio communication means to be completely integrated (for example in the dashboard of the vehicle), for ergonomic and cosmetic reasons, as well as to protect against theft. The access to the SIM card holder thus becomes a problem.

There is consequently a need to optimise the use of two dual SIM cards by a user in two distinct radio communication terminals, especially in the case where the user wishes to use successively at least one of these dual SIM cards with different terminals (for example in terminals in different rental cars).

SUMMARY

An aspect of the disclosure relates to a method of customising a first radio communication terminal, which has an operating mode which requires first customisation data in order to permit a first radio communication link with a radio communication network.

According to an embodiment of the invention, the method comprises the following steps:
- placing said first terminal in actual conditions of use, without said first customisation data;
- transmission of said first customisation data from a customisation device to said first radio communication terminal, via a second link that is distinct from said first link.

Consequently, an embodiment of the invention is based on a novel and inventive approach to the customisation of a radio communication terminal waiting to be attributed an identity. Indeed, this customisation is carried out automatically from customisation data transmitted by a customisation device, via a link that does not require any customisation data, from the radio communication terminal side, to be established. The user is therefore exempted from this tiresome task. It should be noted that if the user wishes to be involved in the customisation of the radio communication terminal (for example to be close to the radio communication terminal and the customisation device), this is not obligatory and in all circumstances involves less constraints than the use of the usual customisation data storage means, such as SIM cards (which is the current technique).

By actual conditions of use, it is meant any context of use outside of the factory.

According to one advantageous aspect, the customisation device is incorporated into a second radio communication terminal using second customisation data. According to an embodiment of the invention, the method comprises a step for obtaining said first customisation data by the second radio communication terminal.

In a first specific embodiment of the invention, said step for obtaining said first customisation data comprises a step of reading said first customisation data in storage means implemented in the customisation device.

In a second specific embodiment of the invention, said step for obtaining said first customisation data comprises the following steps:
- the customisation device sends a customisation data allocation request to a remote server;
- the server sends the customisation device a reply containing said first customisation data.

This second embodiment of the invention covers a first case where the server identifies the user by means of an identification/authentication algorithm implemented by the communication network, for example of the GSM type.

It also covers a second case wherein the server identifies the user by means of an identifier entered by the user, for example via the man/machine interface of the customisation device that is transmitted to the server via the allocation request.

An embodiment of the invention advantageously proposes to generate the customisation data dynamically. Consequently, a network operator may optimise, for example, the number of IMSIs active on its network.

Advantageously, the method further comprises a step wherein the customisation device obtains an identifier of said first terminal. According to an embodiment of the invention, said customisation data allocation request comprises said identifier of said first terminal. Furthermore, the server encodes said reply, before sending it to the customisation device, with an encoding key associated to said first terminal, wherein said key is known from said server and said first terminal. Advantageously, said customisation device transmits the encoded reply to said first terminal via said second link.

An embodiment of the invention proposes to maximise the security of the customisation data exchanged, by using unique data encoding between the server and each radio communication terminal waiting to be attributed an identity.

In one preferred embodiment of the invention, said step for obtaining an identifier of said first terminal with the customisation device comprises at least one action from the following group:
- entry of said identifier by a user via an man/machine interface of said customisation device;
- launching by the user, via a man/machine interface of said first terminal, of a step wherein said identifier is sent from the first terminal to said customisation device, via said second link;
- detection of the presence of said customisation device close to said first terminal, or inversely, such that in the event of a positive detection said first terminal transmits, directly or in response to an identification request that has been sent previously by the device, said identifier to said customisation device via said second link.

According to one advantageous aspect of the invention, said second radio communication terminal belongs to a user, wherein said second customisation data is associated to said user. According to an embodiment of the invention, said first customisation data is also associated to said user.

It is therefore possible to obtain dual SIM cards. Indeed, an embodiment of the invention permits a radio communication terminal to be customised with customisation data associated to a user. An embodiment of the invention proposes to send this customisation data from a radio communication terminal (already identified) belonging to the user. In this case, the user is identified from its own radio communication terminal.

Preferably, the method comprises a step wherein the user is identified by the customisation device.

It is therefore advantageously possible to provide for the identification of a user, no longer from a radio communication terminal belonging to the user, but from information specific to the user that is known to the customisation device, for example a password, a digital fingerprint, a vocal expression, etc.

According to another advantageous aspect of the invention, said second radio communication terminal belongs to a first entity that is distinct from a second entity to which said first terminal belongs, wherein the second customisation data is associated to said second entity. According to an embodiment of the invention, said first customisation data is associated to said first entity.

Advantageously, said first terminal comprises a SIM card. According to an embodiment of the invention, the method comprises a step for storing said first customisation data on said SIM card.

It may be noted that the SIM card further permits the encoding key defined in claim 6 to be stored.

Preferably, said customisation data comprises at least one of the following elements:
an IMSI identity number;
a Ki authentication key; and
an authentication algorithm.

Advantageously, the method further comprises a step wherein said first terminal and/or said customisation device is supplied, by said user, with an authorisation for the customisation of said first terminal with said first customisation data received via the second link.

Preferably, the method comprises a phase for deactivating the customisation of said first terminal.

Advantageously, said deactivation phase comprises the following steps:
sending of a deactivation request from the first terminal to said customisation device via said second link;
supply to said first terminal and/or customisation device, by said user, of an authorisation to deactivate the customisation of said first terminal.

An embodiment of the invention also relates to a device for customising a first radio communication terminal which has an operating mode that requires first customisation data in order to make possible a first radio communication link with a radio communication network. According to an embodiment of the invention, the device comprises:
means of obtaining said first customisation data;
means of transmitting said customisation data to said first radio communication terminal, via a second link that is distinct from said first link.

An embodiment of the invention also relates to a first radio communication terminal comprising means of implementing an operating mode that requires first customisation data in order to make possible a first radio communication link with a radio communication network. According to an embodiment of the invention, the first terminal comprises:
means of obtaining said first customisation data;
means of activating said first customisation data obtained by said obtaining means.

An embodiment of the invention further relates to a SIM card of a first radio communication terminal that has an operating mode that requires first customisation data in order to make possible a first radio communication link with a radio communication network. According to an embodiment of the invention, the SIM card comprises means of storing said first customisation data.

An embodiment of the invention further relates to a customisation server that has an operating mode that requires first customisation data in order to make possible a first radio communication link with a radio communication network. According to an embodiment of the invention, the server comprises:
means of obtaining an allocation request for the customisation data transmitted by said customisation device;
means of transmitting to the customisation device a reply containing said first customisation data.

An embodiment of the invention further relates to a computer program product comprising program code instructions to run the steps of the above-mentioned method, when said program is run on a computer.

An embodiment of the invention further relates to storage means, that may be partially or completely removable, that can be read by a computer, which store a set of instructions that may be run by said computer to implement said above-mentioned method.

BRIEF DESCRIPTION OF THE DRAWINGS

List of Figures

Other features and advantages will become clearer upon reading the following description of a preferred embodiment, provided by way of illustrative and non-restrictive example, and the appended drawings, among which.

DETAILED DESCRIPTION OF ILLUSTRATIVE EMBODIMENTS

Figure 1:
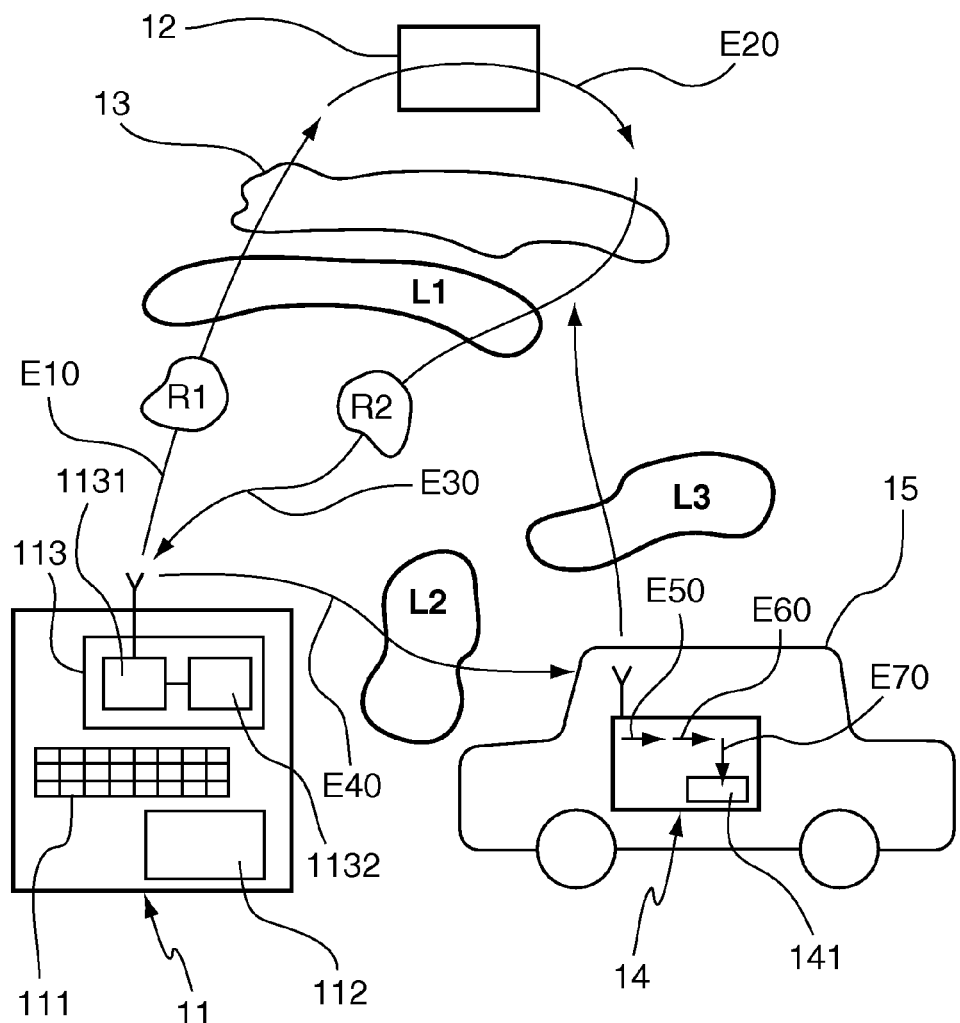
FIG. 1 illustrates a specific embodiment of the invention, in the case of a customisation of an embedded radio communication terminal in a rental car.

For reasons of clarity, in all of the figures of this document the means are referenced with numerical references (e.g. 1, 2 3, etc.) and the steps of the method are referenced by alpha-numerical references (e.g. E1, E2, E3, etc.).

An embodiment of the invention therefore aims to provide a technique for customising a radio communication terminal waiting to be attributed an identity.

1. Customisation According to an Embodiment of the Invention as Part of Dual SIM Card Management In the rest of the description, it is supposed by way of example that the customisation device according to an embodiment of the invention is included in a first radio communication terminal (for example a first GSM radio telephone) belonging to a user, and transmits the customisation data to a second radio communication terminal (for example a second GSM radio telephone) on-board a rental car, via a radio link.

In order to simplify the description, in the rest of the document we will simply describe the specific case of a BlueTooth type link between the first terminal (of the user) and the second terminal (of the car). Of course, any other type of link (wire or wireless) may be envisaged (ZigBee, RTC, etc.).

In the specific embodiment described below in relation to FIG. 1, the customisation method according to an embodiment of the invention especially involves a remote server that can be accessed by the first terminal via the GSM communication network that dynamically generates the customisation data to be transmitted to the second terminal.

It is important to note that an embodiment of the invention also covers the case where the first terminal (of the user) directly transmits customisation data (for example stored in the storage means that are part of the first terminal) to the second terminal (of the car) (via a BlueTooth link for example).

A first GSM terminal 11 of the standard type, especially comprising a man/machine interface 111, for example an alpha-numerical keypad, permitting a user to enter a customisation data allocation request to a remote server 12, and a SIM card 112 comprising data related to the user. This first GSM terminal 11 communicates with the remote server 12 via a GSM communication network 13.

According to an embodiment of the invention, this first GSM terminal 11 is equipped with a customisation device 113, that itself comprises means 1131 of obtaining customisation data and means 1132 of transmitting customisation data.

In the present embodiment, a second GSM terminal 14 comprising a "blank" SIM card 141 (which is to say a SIM card with no customisation data) is on-board a rental car 15. It is important to note that the second terminal 14 is placed in actual conditions of use (which is to say in conditions of use outside of the factory), without it being able to communicate with the network 13. Indeed, prior to customisation, the second terminal 14 does not have the customisation data required to be identified in the network 13, which is to say an IMSI identity number, a Ki authentication key and an authentication algorithm (which may be specific to each operator).

Now in reference to FIG. 1, a specific embodiment of the method according to the invention will be described, which allows a user to customise the SIM card of a second GSM terminal 14 on-board a rental car 15, by means of a first GSM terminal that belongs to the user.

As already stated, in the embodiment illustrated, the customisation device 113 according to the invention is included in the first GSM terminal 11 of the user. Furthermore, it is supposed that the second terminal 14 of the car is identified by a unique identifier. This unique identifier is for example an alpha-numerical code positioned so that it is visible on the dashboard of the vehicle.

In a first step E10, the user enters, via the man/machine interface 111 of the first GSM terminal 11, the identifier of the second terminal 14, and launches the issue of an identity allocation request to the remote server 12, via a first GSM link L1. This allocation request translates by the sending of a customisation data allocation request R1 to the server. It is important to note that the allocation request contains the identifier of the radio communication terminal 14.

In one variant of the embodiment, the obtaining of the identifier of the second terminal is conditioned by the action on the man/machine interface positioned on or close to the dashboard of the vehicle.

In another variant of the embodiment, the obtaining of the identifier of the second terminal is conditioned by the detection of the presence of the customisation device 113 (on-board the telephone) close to the second terminal 14.

In a step E20, the server 12 identifies the user by means of a standard authentication/identification algorithm used by the GSM network. It may be noted that the GSM network knows the identity of the user as the latter is connected to the network by means of a first terminal in which a customised SIM card is inserted.

In a step E30, the server 12 sends to the first GSM terminal 11 a reply R2 containing customised data associated to the user. It may be noted that the customisation data is dynamically generated or selected by the server. In other terms, the server generates or selects for each allocation request a new IMSI and associates it to the MSISDN number of the user identified in step E20. In this specific embodiment, the server encodes the reply before sending it to the first GSM terminal 11, with an encoding key associated to the identifier of the SIM card of the second terminal 14. In other terms, the encoded reply can only be read by the second terminal 14. As illustrated, the encoded reply is sent to the first GSM terminal 11 via the first GSM link L1.

In a step E40, the first GSM terminal 11 transmits the customisation data obtained in step E30 to the second terminal 14 of the car, via a BlueTooth link L2.

Next, in a step E50, one or several customisation information messages are sent to the user via a man/machine interface (not shown) positioned on or close to the dashboard of the vehicle (for example in the form of a text on a LCD screen or a voice message via a loudspeaker, etc.).

Then, in a step E60, the replies of the user to the information messages previously received (step E50) are distinguished, such that:
   if the user replies negatively to this/these information message(s), then there is a return to step E10, which is to say that the user does not wish to continue with the customisation;
   in return, if the user replies positively to this/these information message(s), then the step E70 is started, which is to say that the user wishes to continue with the customisation.

Finally, in step E70, the customisation data associated to the user is stored in the blank SIM card of the second terminal 14. At this point, the second terminal 14 is recorded on the GSM communication network 13 with the identity of the user, and may then be used by the user to receive/transmit telephone calls via a second GSM link L3.

It is important to note that the blank SIM card becomes, after storing customisation data associated to the user, a dual SIM card (in the general meaning defined above) with that inserted in the first terminal.

It may further be noted that the customisation data (associated to the user) stored on the dual SIM card (which is to say that which is inserted in the second terminal) is customisation data that is temporarily activated. Indeed, when the second terminal is no longer used (for example when the rental car is returned by the user), the customised data associated to the user is deactivated (which is to say wiped from the SIM card).

In one preferred embodiment, the following acquittal requests are provided:
   a first acquittal request sent to the first GSM terminal 11 by the second terminal 14, via the BlueTooth link;
   a second acquittal request sent to the remote server 12 by the first GSM terminal 11 via the first GSM link;
   a third acquittal request sent to the remote server 12 by the second terminal 14 via the second GSM link.

2. Customisation According to an Embodiment of the Invention in an M2M Application Below, in reference to FIG. 2, a specific embodiment of the method according to the invention is described, which permits a fitter of a data measurement appliance management company to customise N SIM cards that each belong to a second on-board GSM terminal for example in a water meter, by means of a first GSM terminal (for example a PDA). In the present embodiment, the customisation device according to the invention is included in the first GSM terminal, and each second GSM terminal has a blank SIM card.

Figure 2:
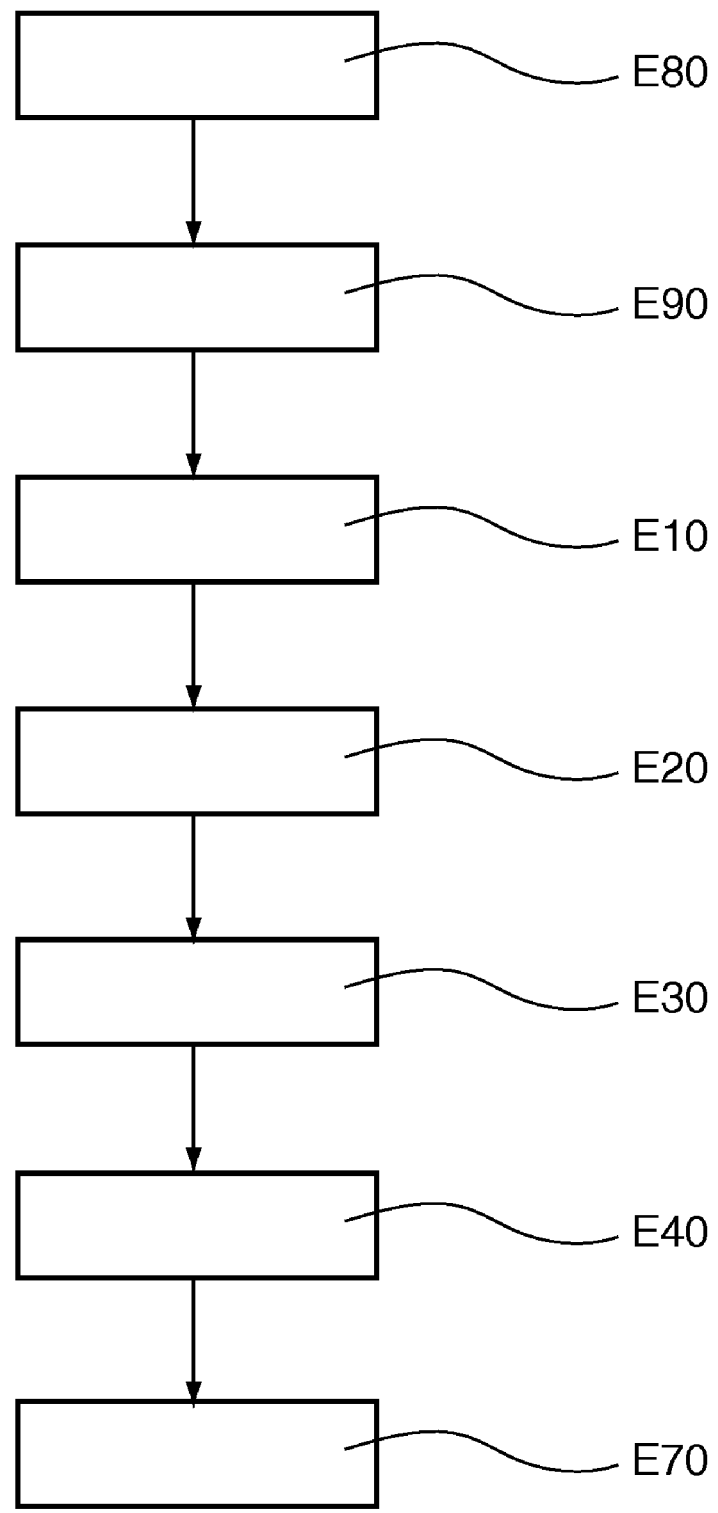
FIG. 2 illustrates a specific embodiment of the invention, in the case of a customisation of an on-board radio communication terminal in water meters.

As it may be noted, certain steps of FIG. 2 are identical (same alpha-numerical references) to certain steps previously described in FIG. 1. For clarity, these common steps will not be described again below.

In the present embodiment, the fitter customises the N SIM cards of the second terminals one after the other. In other terms the following steps are implemented for each second terminal.

In a first step E80, the fitter obtains via the first GSM terminal carrier information (for example information on the power/quality, on the networks (PLMN), etc.) for the operators that are visible at the location of the second terminal.

In a step E90, the fitter chooses, for example, the operator that has the best network quality.

Steps E10, E20, E30, E40 and E70 (already described in reference to FIG. 1) are related to request phases (by the first GSM terminal) to obtain and store on the blank SIM card of the second terminal for the customisation data specific to the operator chosen in step E90.

It may be noted that in this embodiment, there may or may not be a link (seen from the operator side) between the SIM cards once they have been customised. In other terms, the N SIM cards of the second terminals may be dual SIM cards, however in return the SIM card of the first terminal is not part of the set of SIM cards that are jointly managed by the radio communication network operator.

3. Customisation Device

Figure 3:
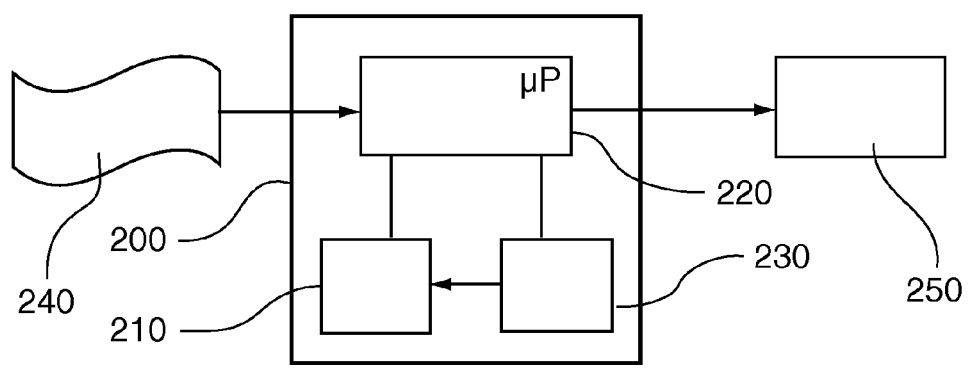
FIG. 3 presents the simplified structure of a specific embodiment of a customisation device of the invention.

FIG. 3 shows diagrammatically the structure of a customisation device 200 according to an embodiment of the invention, which comprises a memory 210 and a processing unit 220 equipped with a microprocessor μP, that is driven by a computer program (or application) 230 which implements the method according to an embodiment of the invention. The processing unit 220 receives in input a customisation data allocation request 240. The microprocessor μP processes this demand according to the instructions of the program 230, to obtain customisation data 250 associated to a user.

At least embodiment of the disclosure provides a customisation technique for a radio communication terminal that is simple and efficient to implement.

At least one embodiment provides such a technique that is ergonomic and eliminates, or at least restricts, the manual entry operations that have to be carried out by the user.

At least one embodiment proposes such a technique that is adapted to customisation in the field of a large number of radio communication terminals used in M2M type point to point mode applications.

At least one embodiment proposes such a technique that is adapted to managing dual SIM cards.

At least one embodiment proposes such a technique that permits improved mobility for the user.

At least one embodiment provides such a technique that permits a user to authorise or refuse the customisation of a radio communication terminal.

At least one embodiment proposes such a technique that is cheap and compatible with all existing communication terminals.

At least one embodiment proposes such a technique that permits a user to deactivate easily the customisation of a radio communication terminal.

Although the present disclosure has been described with reference to one or more examples, workers skilled in the art will recognize that changes may be made in form and detail without departing from the scope of the disclosure and/or the appended claims.

The invention claimed is:

1. A method for customizing a first radio communication terminal, wherein the method comprises the following steps:
    placing the first radio communication terminal in use, outside of a factory, with a blank SIM card, inside which first customization data can be stored, the first customization data permitting the first radio communication terminal to establish a first radio communication link between said first radio communication terminal and a radio communication network, wherein during said placing step, said blank SIM card is devoid of all customization data that are linked to a radio communication network, such that said first radio communication terminal is not able to communicate with any radio communication network; and
    after said step of placing the first radio communication terminal in use, and before establishing said first radio communication link, transmitting said first customization data from a customization device to said first radio communication terminal, via a second link that is distinct from said first link.

2. The method according to claim 1 wherein the customization device is included in a second radio communication terminal which uses second customization data and wherein said method comprises a step of obtaining said first customization data by the second radio communication terminal.

3. The method according to claim 2 wherein said step of obtaining said first customization data comprises a step of reading said first customization data in a storage device implemented in the customization device.

4. The method according to claim 2 wherein said step of obtaining said first customization data comprises the following steps:
    the customization device sends a customization data allocation request to a remote server;
    the server sends the customization device a reply containing said first customization data.

5. The method according to claim 4, wherein the method further comprises a step of obtaining an identifier of said first terminal by the customization device, wherein:
    said customization data allocation request comprises said identifier of said first terminal,
    the server encodes said reply, before sending it to the customization device, with an encoding key associated to said first terminal, wherein said key is known from said server and said first terminal,
    and said customization device transmits the encoded reply to said first terminal via said second link.

6. The method according to claim 5 wherein said step of obtaining an identifier of said first terminal with the customization device comprises at least one action from the following group:
    entry of said identifier by a user via a man/machine interface of said customization device;
    launching by the user, via a man/machine interface of said first terminal, of a step wherein said identifier is sent from the first terminal to said customization device, via said second link;
    detection of the presence of said customization device close to said first terminal, or inversely, such that in the event of a positive detection said first terminal transmits, directly or in response to an identification request that has been sent previously by the device, said identifier to said customization device via said second link.

7. The method according to claim 2, wherein said second radio communication terminal belongs to a user, wherein said second customization data is associated to said user and said first customization data is also associated to said user.

8. The method according to claim 7, wherein the method comprises a step of identifying the user by the customizing device.

9. The method according to claim 2, wherein said second radio communication terminal belongs to a first entity that is distinct from a second entity to which said first terminal belongs, and wherein the second customization data is associated to said second entity, and in that said first customization data is associated to said first entity.

10. The method according to claim 1, wherein the method comprises a step of storing said first customization data in said SIM card.

11. The method according to claim 1, wherein said customization data comprises at least one of the following elements:
   an IMSI identity number;
   a Ki authentication key; and
   an authentication algorithm.

12. The method according to claim 1, wherein the method further comprises a step wherein at least one of said first terminal or said customization device is supplied, by said user, with an authorization for the customization of said first terminal with said first customization data received via the second link.

13. The method according to claim 1, wherein the method comprises a phase for deactivating the customization of said first terminal.

14. The method according to claim 13 wherein said deactivation phase comprises the following steps:
   sending a deactivation request from the first terminal to said customization device via said second link;
   supplying to at least one of said first terminal or said customization device, by said user, of an authorization to deactivate the customization of said first terminal.

15. A device for customizing a first radio communication terminal, which has an operating mode that requires first customization data in order to make possible a first radio communication link with a radio communication network, wherein the device comprises:
   means for obtaining said first customization data; and
   means for transmitting said customization data, via a second link that is distinct from said first link, to said first radio communication terminal, which comprises a blank SIM card devoid of all customization data that are linked to a radio communication network, such that said first radio communication terminal is not able to communicate with any radio communication network prior to receiving said customization data from said device.

16. A first radio communication terminal comprising:
   a SIM card, inside which first customization data can be stored, the first customization data permits the first radio communication terminal to establish a first radio communication link between said first radio communication terminal and a radio communication network;
   means for implementing an operating mode outside a factory in which said SIM card is blank and devoid of all customization data that are linked to a radio communication network, such that said first radio communication terminal is not able to communicate with any radio communication network;
   means for implementing an operating mode that requires said first customization data in order to make possible said first radio communication link with a radio communication network;
   means for obtaining said first customization data after implementing said operating mode in which said SIM card is blank; and
   means for activating said first customization data obtained by said obtaining means.

17. A computer program product saved onto a support that can be read by a computer and/or run by a processor, wherein the product comprises program code instructions to run a method for customizing a first radio communication terminal, which has an operating mode that requires first customization data in order to permit a first radio communication link with a radio communication network, when said program is run on a computer, wherein the method comprises the following steps:
   placing said first radio communication terminal in use, outside a factory, with a blank SIM card that is devoid of all customization data that are linked to a radio communication network, such that said first radio communication terminal is not able to communicate with any radio communication network; and
   after the step of placing the first radio communication terminal in use, transmitting said first customization data from a customization device to said first radio communication terminal, via a second link that is distinct from said first link.

18. A computer-readable storage device that can be read by a computer, which stores a set of instructions that may be run by said computer to implement a method for customizing a first radio communication terminal, which has an operating mode that requires first customization data in order to permit a first radio communication link with a radio communication network, wherein the method comprises the following steps:
   placing said first radio communication terminal in of use, outside a factory, with a blank SIM card without said first customization data, such that said first terminal is not able to communicate with any radio communication network; and
   after the step of placing said first radio communication terminal in use, transmitting said first customization data from a customization device to said first radio communication terminal, via a second link that is distinct from said first link.

* * * * *